United States Patent [19]
Stapleton

[11] Patent Number: 5,577,650
[45] Date of Patent: Nov. 26, 1996

[54] SPLIT STANCHION ARTICLE CARRIER WITH PIVOTING THUMBWHEEL

[75] Inventor: Craig A. Stapleton, Troy, Mich.

[73] Assignee: Advanced Accessory Systems L.L.C., Sterling Heights, Mich.

[21] Appl. No.: 349,792

[22] Filed: Dec. 6, 1994

[51] Int. Cl.$^6$ ........................................... B60R 9/00
[52] U.S. Cl. ................................. 224/321; 224/326
[58] Field of Search ............................. 224/321, 325, 224/326, 309, 322, 329, 331, 330

[56] References Cited

U.S. PATENT DOCUMENTS

| | | | |
|---|---|---|---|
| 3,270,994 | 9/1966 | Machan et al. | 248/316.5 |
| 4,162,755 | 7/1979 | Bott . | |
| 4,270,681 | 6/1981 | Ingram . | |
| 4,274,570 | 6/1981 | Bott . | |
| 4,323,182 | 4/1982 | Bott . | |
| 4,487,348 | 12/1984 | Mareydt . | |
| 4,736,878 | 4/1988 | Rasor | 224/321 |
| 4,988,026 | 1/1991 | Rasor et al. | 224/321 |
| 5,205,453 | 4/1993 | Pudney et al. . | |
| 5,232,138 | 8/1993 | Cucheran . | |
| 5,320,264 | 6/1994 | Weir | 224/321 |
| 5,385,285 | 1/1995 | Cucheran et al. | 224/321 |
| 5,419,479 | 5/1995 | Evels et al. | 224/322 |

FOREIGN PATENT DOCUMENTS 2804588  11/1983  Germany ........................ 224/321

Primary Examiner—Linda J. Sholl
Attorney, Agent, or Firm—Rader, Fishman & Grauer PLLC

[57] ABSTRACT

A crossbar and article carrier are provided, the crossbar having stanchions at each end thereof. Each stanchion has a first jaw member affixed thereto and a second jaw member pivotally coupled thereto. The second jaw member includes a thumbwheel and stem, the stem having a cam follower surface thereon. The stanchion includes a ramped surface with a detent for receiving and locking the cam when the thumbwheel is rotated. In this manner, the crossbar may be detachably mounted to the longitudinal side rails. The design and location of the jaws and thumbwheel provide for easy attachment and detachment of the crossbar rail. The design of the second jaw member further provides mechanical advantage for clamping the first and second jaw members over a lip protruding from the side rails.

11 Claims, 4 Drawing Sheets

FIG 6
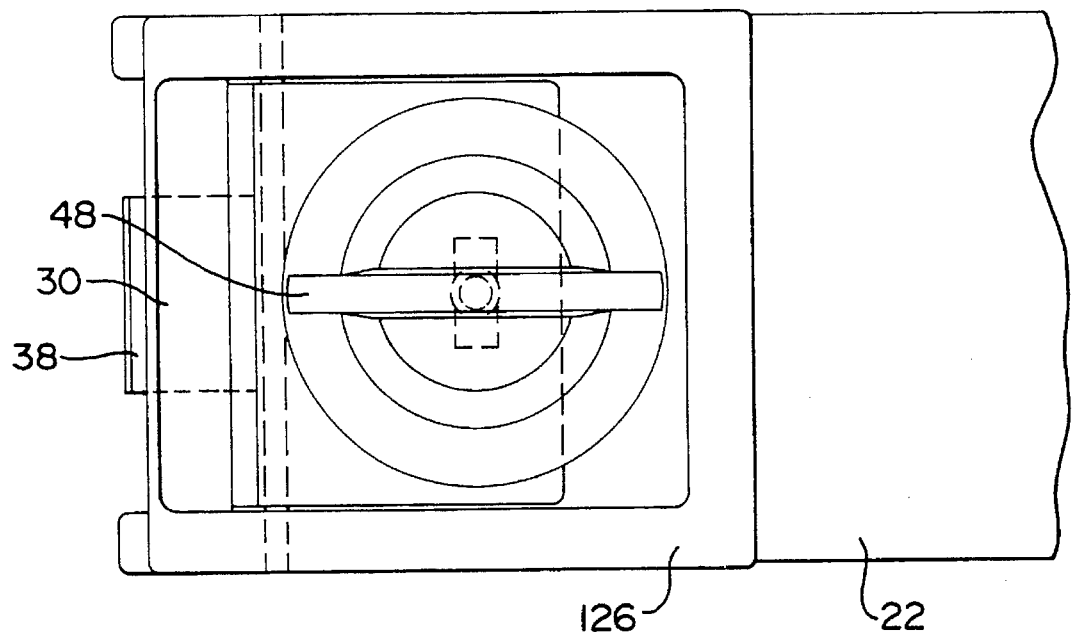
FIG 7
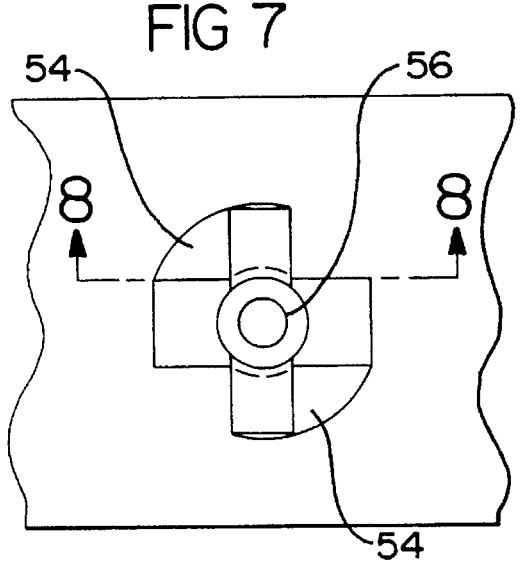
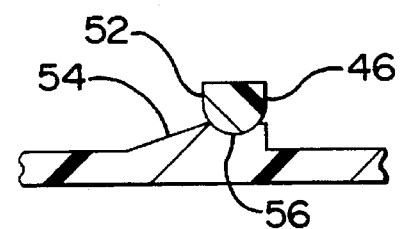
FIG 8

SPLIT STANCHION ARTICLE CARRIER WITH PIVOTING THUMBWHEEL

TECHNICAL FIELD

The present invention relates generally to vehicle luggage racks and more particularly to article carriers on automobiles having movable crossbars with respect to longitudinal side rails mounted on the vehicle.

BACKGROUND ART

The prior art provides many different article carrier designs. Initially, article carriers were rigidly mounted to the tops of vehicles. More recently, engineering developments have provided article carriers with movable crossbars which allow for adjustment when carrying articles of different sizes or configurations. However, the majority of these article carriers having movable crossbars or detachable crossbars are complicated or difficult to operate.

In general, the prior art provides article carriers comprising longitudinal side rails attached to a vehicle panel. One or two crossbars are provided having stanchions at opposite ends thereof to support the crossbars with respect to the longitudinal rails. The previous clamping mechanisms provided to clamp the stanchions with respect to the longitudinal side rails are generally complex and inconvenient to the operator.

U.S. Pat. No. 4,487,348 to Mareydt discloses an external cargo carrier for a vehicle, including a mechanism allowing longitudinal adjustment of a crossbar relative to a pair of transversely spaced side rails and permitting detachment of the crossbar from the side rails. The stanchion is provided with a jaw pivotally connected thereto and having a thumbwheel thereon for attachment to the stanchion. The stanchion is placed upon a lip of a longitudinal side rail, and the pivoting jaw is pivoted over the bottom of the lip in order to clamp onto the lip. The thumbwheel is then screwed in in order to tighten the jaw and stanchion over the lip. This design is somewhat impractical because it may be difficult to remove and reattach the pivoting jaw to the lip. The pivoting jaw is located beneath the stanchion in a difficult to reach area, and the thumbwheel is provided with a threaded screw for screwing into an internally threaded opening in the stanchion. Numerous turns of the thumbwheel are required in order to release or fully engage the clamp, particularly where a fine pitch is needed to reduce manipulation effort. This arrangement may be unduly difficult for the operator.

Another prior art design is disclosed in U.S. Pat. No. 4,270,681, which provides an article carrier with a slidable bracket. The rails include an open topped channel having a reduced access opening. The bracket includes a base section slidably movable in the channel that retains the bracket within the channel of the rail. The bracket and crossbar mounted to the bracket may be removed from the track only if the bracket is slid all the way to the open end of the farthest extent of the longitudinal rail. Moreover, the bracket can be locked into position along the longitudinal rail by a key which is threadably secured to a rotatable disk. As the disk is rotated, the key is urged into engagement with the base of a track to urge the base section of the bracket up against the top wall of the restricted channel opening in the longitudinal rail. Such a structure stresses the material forming the reduced opening for the channel in the longitudinal rail. Accordingly, this design is not desirable.

Other commonly known article carriers are disclosed in U.S. Pat. Nos. 4,162,755, 4,274,570 and 4,323,182. These patents disclose a stanchion element carried on top of a channeled longitudinal rail. The stanchion receives a through bolt carried by a locking plate that is retained within the rail channel. The bolt extends through the stanchion member for engagement with a rotatable wheel for tightening the bolt and pressing the top wall of the rail, including the restricted channel opening, between the plate and the stanchion element. However, the threaded bolt must be disengaged and removed from one of the threaded apertures in the wheel or the lower plate so that the parts may be separated for removal of the stanchion from the longitudinal rail. Alternatively, with the clamping device loosened, the stanchion and crossbar must be slid completely to one longitudinal end of the longitudinal rail to remove the stanchion and crossbar from the rack in the absence of complete disassembly of the bolt retaining mechanism.

SUMMARY OF THE INVENTION

Accordingly, the present invention provides an article carrier, comprising: spaced longitudinal side rails, each side rail having a lip, and a crossbar having first and second stanchions for supporting the crossbar on the longitudinal side rails, at least one of the stanchions having a first jaw with a jaw surface engageable with the side rail and second jaw with the jaw surface engageable with the side rail, a pivot coupling the first jaw to the second jaw, the first jaw pivoted for engagement with the lip opposite the second jaw, and a clamp for selectively clamping the first and second jaws including a thumbwheel and a threaded stem carried by the first jaw, wherein the access for pivoting is intermediate the first jaw and the stem.

Further, the present invention provides an article carrier in which a pivoting jaw is clamped against a rail lip by a thumbwheel carrying a ramp follower that rides upon a ramp surface under a fixed jaw, comprising: a pair of spaced longitudinal side rails, each side rail having a lip protruding therefrom, each lip having first and second surfaces; a crossbar having first and second ends, each end including a stanchion for supporting the crossbar on the longitudinal side rails, at least one of the stanchions having a ramped surface and an upper surface; the at least one of the stanchions having a first jaw member with a first jaw surface engageable with the first surface of one of the lips; a second jaw member pivotally coupled about a pivot axis with respect to the first jaw member for engagement with the lip opposite the first jaw surface, the second jaw member having a second jaw surface engageable with the second surface of said one of the lips; a clamp for selectively clamping the first and second jaw members with respect to said one of the lips, including a thumbwheel and stem carried by the second jaw member, the stem including a cam surface thereon for engagement with the ramped surface on said at least one of the stanchions to selectively secure the second jaw member with respect to said at least one of the stanchions when the thumbwheel is rotated to engage the cam surface with the ramped surface; and wherein the axis for pivoting the second jaw member is intermediate the second jaw surface and the stem to permit the development of mechanical advantage to tighten the first and second jaw members with respect to said one of the lips.

Another particularly advantageous feature of the present invention is that the article carrier further includes a resilient spring operatively connected about the pivot axis between the first and second jaw members for biasing the second jaw member toward an unclamped position to provide clearance with respect to the lip for disassembly. The present invention further provides a thumbwheel, cam surface, ramp and detent arrangement which requires less than one full rotation of the thumbwheel in order to clamp the jaws of the stanchion into the place.

In the preferred embodiment, one of the lips includes a plurality of apertures formed in its second surface and spaced longitudinally therealong, and a jaw finger protrudes from the second jaw surface for selective operative engagement within any one of the plurality of apertures formed in the second surface of said one of the lips to prevent longitudinal movement of the crossbar with respect to the side rail.

Also provided is a crossbar for a vehicle panel mounted article carrier having a pair of spaced longitudinal side rails, each side rail having a lip protruding therefrom, each lip having first and second surfaces, comprising: a crossbar having first and second ends thereof, each end including a stanchion for supporting the crossbar on the longitudinal side rails, at least one of the stanchions having a ramped surface; said at least one of the stanchions having a first jaw member with a first jaw surface engageable with the first surface of one of the lips; a second jaw member pivotally coupled with respect to the first jaw member for engagement with the lip opposite the first jaw surface, the second jaw member having a second jaw surface engageable with the second surface of said one of the lips; a clamp for selectively clamping the first and second jaw members with respect to said one of the lips, including a thumbwheel and stem carried by the second jaw member, the stem including a cam surface thereon for engagement with the ramped surface on said at least one of the stanchions to selectively secure the second jaw member with respect to said at least one of the stanchions when the thumbwheel is rotated to engage said cam surface with the ramped surface; and wherein the axis for pivoting the second jaw member is intermediate the second jaw surface and the stem to permit the development of mechanical advantage to tighten the first and second jaw members with respect to said one of the lips.

Accordingly, an object of the present invention is to provide an article carrier having a crossbar which is easily clamped and unclamped with respect to longitudinal side rails.

Another object of the present invention is to provide an article carrier having a pivotally connected jaw with a thumbwheel-operated clamp, with thumbwheel clamping and release requiring less than one full rotation of the thumbwheel.

A still further object of the present invention is to provide an article carrier utilizing a pair of clamping jaws having a mechanical advantage provided therein for improved clamping capability.

Other objects, features and advantages of the present invention will be apparent from the following detailed description taken in connection with the accompanying drawings.

BRIEF DESCRIPTION OF THE DRAWINGS

FIG. 6 shows an underside view of a stanchion, side rail, and crossbar, in accordance with the present invention;

FIG. 7 shows an underside view of a ramp and detent in accordance with the present invention; and FIG. 8 shows a vertical cross-section of a ramp and detent in accordance with the present invention.

While only examples of the present invention have been disclosed, it should be understood that other forms of Applicant's invention may be had, all coming within the spirit of the invention and scope of the appended claims.

DETAILED DESCRIPTION OF THE PREFERRED EMBODIMENT

Figure 1:
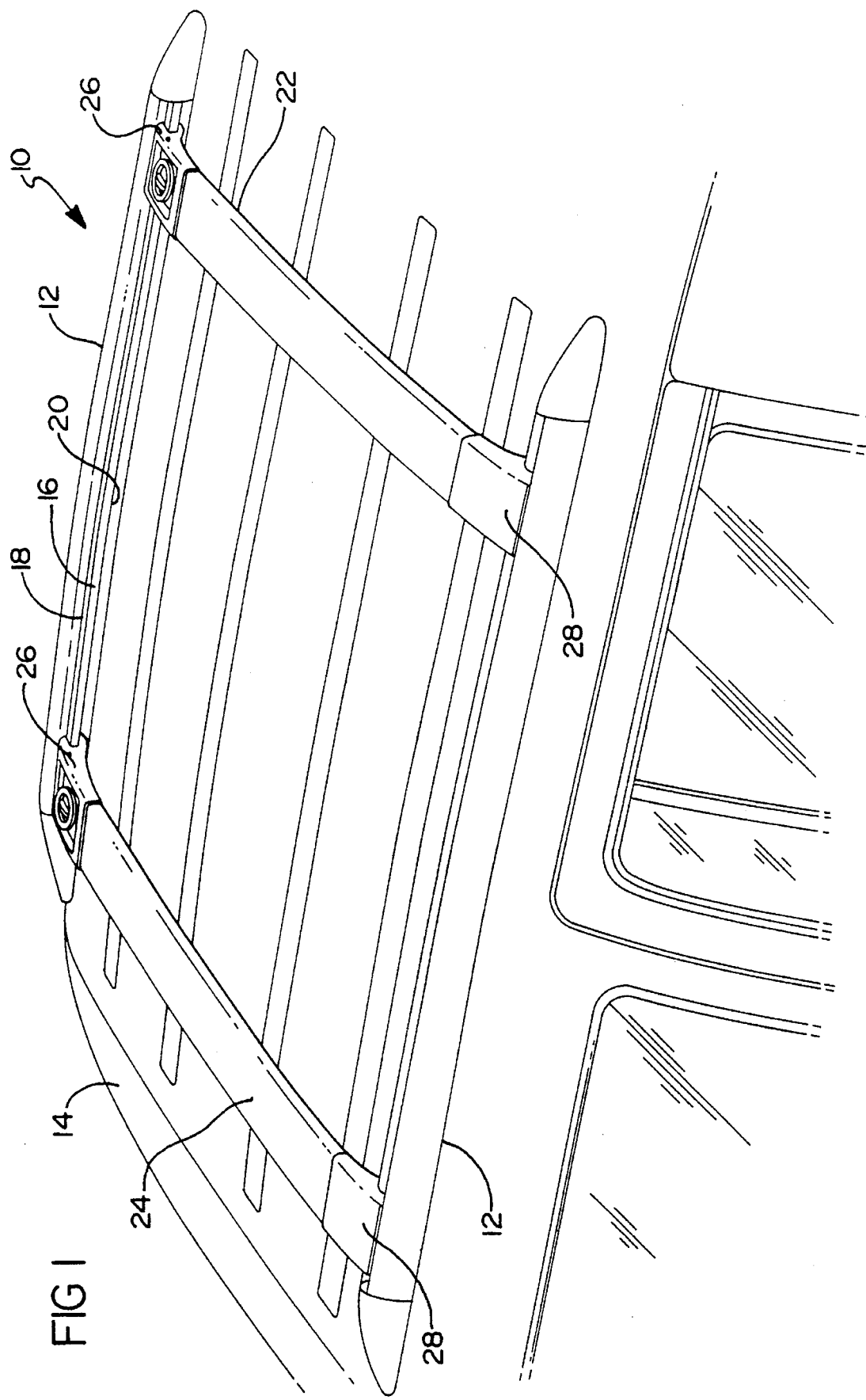
FIG. 1 shows a perspective environmental view of an article carrier in accordance with the present invention.

An article carrier 10 is shown in FIG. 1 in accordance with the present invention. The article carrier 10 comprises a pair of spaced longitudinal side rails 12, each side rail being attached to a vehicle panel 14. Each side rail 12 includes a lip 16 protruding inwardly therefrom. Each lip 16 includes a first and second surface 18,20 on opposed sides thereof. At least one crossbar 22,24 is provided and includes stanchions 26,28 at the first and second ends thereof for supporting the crossbars 22,24 on the longitudinal side rails 12.

Figure 2:
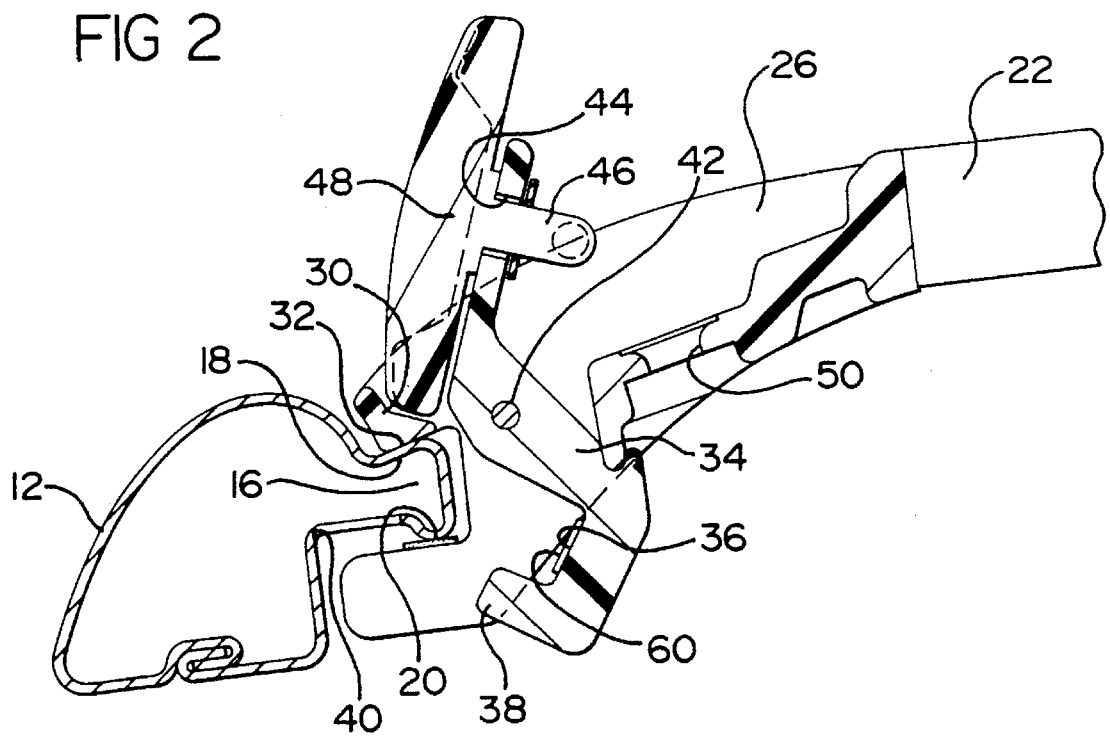
FIG. 2 shows a vertical cross-section of a stanchion, crossbar, and side rail, with the jaw being in the unlocked position, in accordance with the present invention.
Figure 3:
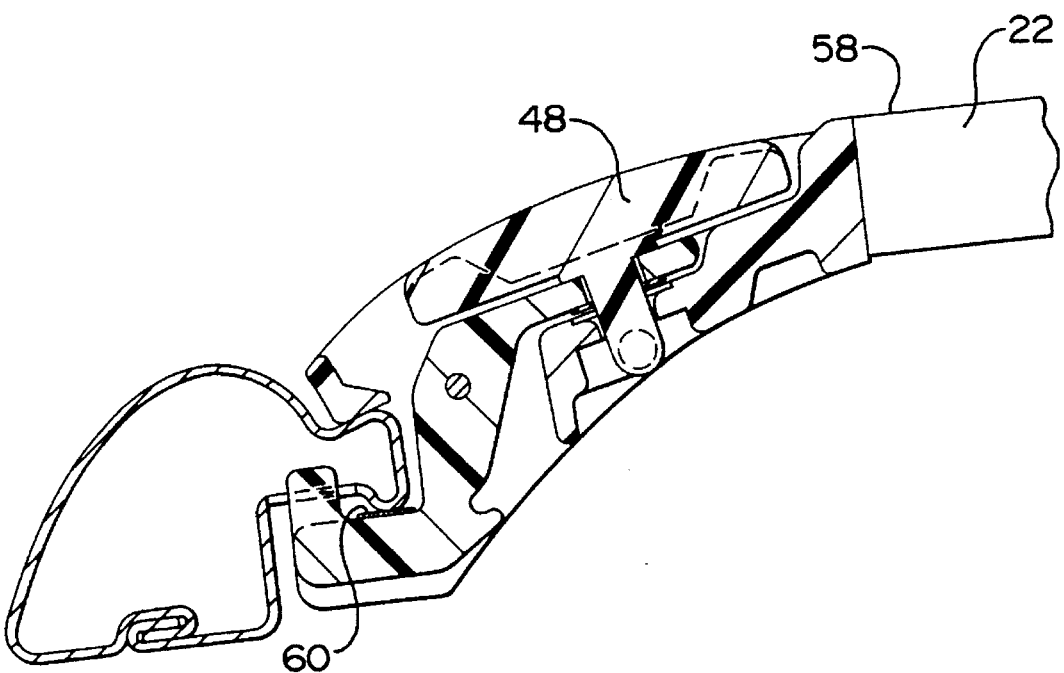
FIG. 3 shows a vertical cross-section of a stanchion, crossbar, and side rail, the jaw being in the clamped position, in accordance with the present invention.

Referring to FIGS. 2 and 3, the most preferred embodiment of the present invention is shown. A side rail 12 is shown having a lip 16 protruding therefrom. The lip includes first and second surfaces 18,20. A stanchion 26 is provided for supporting the crossbar 22. The stanchion 26 includes a first jaw member 30 having a first jaw surface 32. The first jaw surface 32 is placed in engagement with the first surface 18 of the lip 16. In this manner, the lip 16 of the side rail 12 supports the first jaw member 30, which supports the stanchion 26, in order to support the crossbar 22.

In order to secure the crossbar 22 and prevent longitudinal movement of the crossbar 22 with respect to the side rail 12, a second jaw member 34 is provided. The second jaw member 34 includes a second jaw surface 36 adapted for engagement with the second surface 20 of the lip 16. The second jaw member 34 further includes a jaw finger 38. The jaw finger 38 is engageable within the apertures 40 provided in the side rail 12. A plurality of such apertures 40 are provided spaced longitudinally along the side rails 12. In operation, the second jaw member 34 is closed with respect to the first jaw member 30, the second jaw surface 36 engages with the second surface 20 of the lip, and the jaw finger 38 cooperates with one of the plurality of apertures 40 in the side rail 12. The location of the apertures 40 underneath the lip 16 is ideal for preventing build-up of debris therein due to its hidden and protected positioning.

The second jaw member 34 is pivotally mounted to the stanchion 26 about the pivot coupling 42. The second jaw member 34 further includes an aperture 44 therethrough for receiving a stem 46 and thumbwheel 48. When the second jaw member 34 is pivoted about the pivot coupling 42, the stem 46 is received within the stanchion aperture 50. The stem 46 includes a cam surface 52 (as shown in FIG. 8). The stanchion 26 includes a ramped surface 54 (as shown in FIG. 8). When the second jaw member 34 is rotated to move the stem 46 through the stanchion aperture 50, the cam surface 52 is moved to a position adjacent the ramped surface 54. In order to clamp the first and second jaw members 30,34 about the lip 16, the thumbwheel 48 is rotated. When the thumbwheel 48 is rotated, the cam surface 52 of the stem 46 engages with the ramped surface 54 of the stanchion 26. The cam surface 52 rides along the ramped surface 54 until the cam surface 52 pops into place within the detent 56. In this manner, less than one full rotation of the thumbwheel will facilitate clamping and locking of the first and second jaw members 30,34 with respect to the lip 16. Since the cam surface 52 is trapped within the detent 56, the first and second jaw members 30,34 are locked onto the side rail 12, and the stanchion 26 and crossbar 22 are structurally supported and prevented from moving longitudinally or laterally with respect to the side rails 12.

A rubber gasket 60 is positioned on the second jaw surface 36 to engage with the lower lip surface 20. This gasket 60 allows for movement of the jaw finger 38 with respect to the lip 16 as the thumbwheel 48 is tightened. In this manner, cushioning is provided between the lip 16 and the jaw finger 38 as the jaws are tightened. This gasket 60 also provides a certain spring load to the clamp mechanism to enhance clamping.

The distance provided between the pivot coupling 42 and the aperture 44 formed in the second jaw member 34 creates a moment arm which provides mechanical advantage to the user when clamping the first and second jaw members 30,34 with respect to the lip 16. Furthermore, as shown in FIG. 3, the thumbwheel 48 is generally flush with respect to the upper surface 58 of the crossbar 22 when the first and second jaw members 30,34 are clamped together. This flush design is very desirable for consumers concerned with styling and appearance of the article carrier.

In the preferred embodiment, the lip 16 includes a curved cross-section as the transition is made from the first surface 18 to the second surface 20. Further, the lower surface 20 is curved in the direction of the apertures 40. Accordingly, the first jaw surface 32 is curved to mate with the first surface 18 of the lip.

Figure 4:
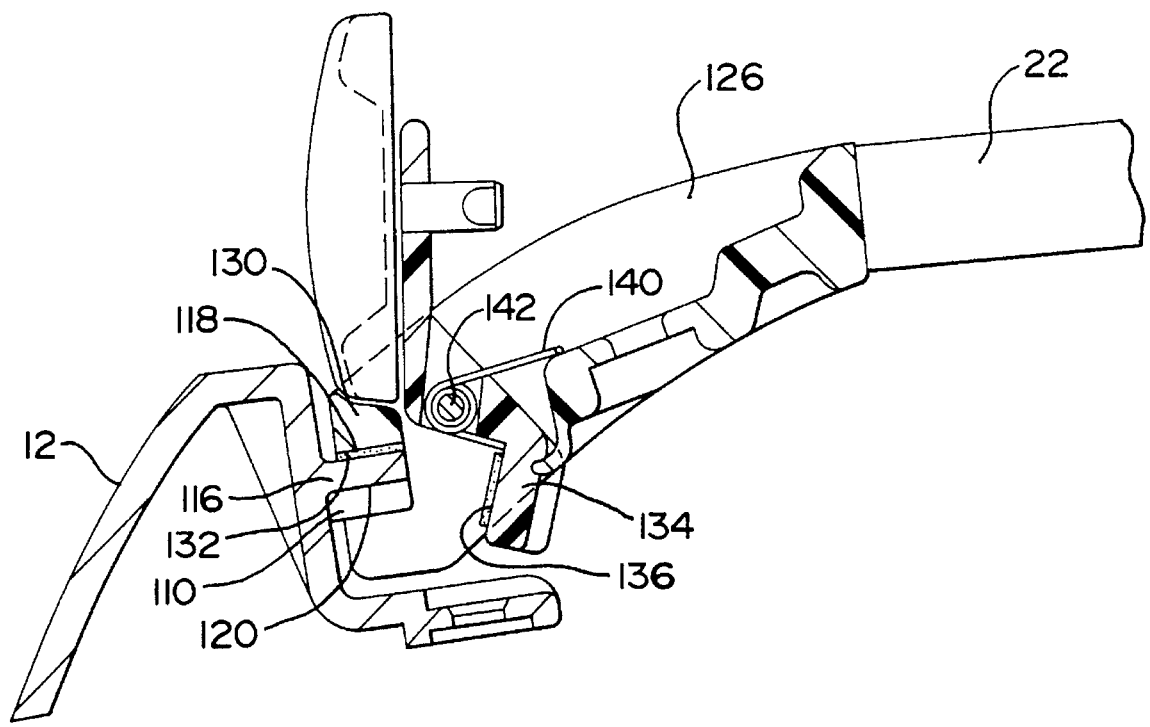
FIG. 4 shows a vertical cross-section of an alternative embodiment of a stanchion, crossbar, and side rail, the jaw being in the unclamped position, in accordance with the present invention.
Figure 5:
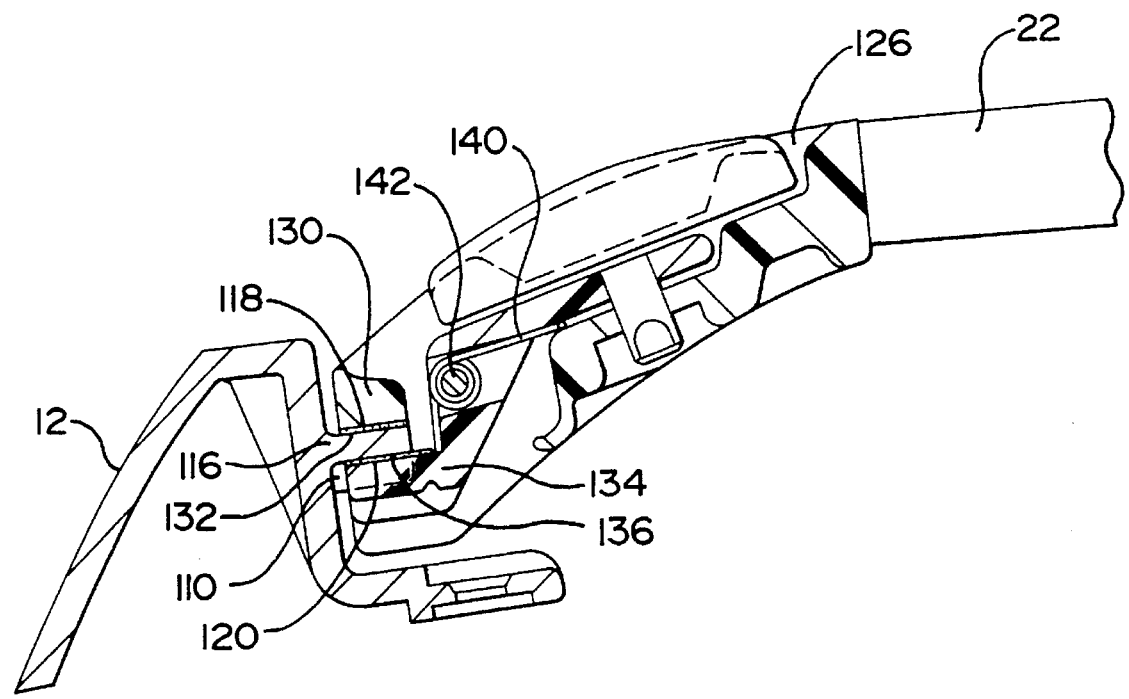
FIG. 5 shows a vertical cross section of an alternative embodiment of a stanchion, crossbar, and side rail, the jaw being in the clamped position, in accordance with the present invention.

A further embodiment of the present invention is shown in FIGS. 4 and 5. In this embodiment, the first and second lip surfaces 118,120, and the first and second jaw surfaces 132,136 are substantially flat as shown. Detents 110 are provided on the lip 116 to prevent longitudinal movement of the crossbar 22 with respect to the side rail 12. The detents 110 will interfere with the sides of the second jaw member 134 in order to prevent longitudinal movement of the second jaw member 134 with respect to the side rail 12 when the first and second jaw members 130,134 are clamped about the lip 116.

Further provided in this embodiment is a spring 140 operatively positioned about the pivot coupling 142 between the stanchion 126 and the second jaw member 134. The spring 140 biases the second jaw member 134 to a fully opened unclamped position with respect to the first jaw member 130. In this manner, when the thumbwheel is turned to disengage the cam surface from the detent and ramped surface, the torsional spring 142 moves the second jaw member 134 to a fully opened position, as shown in FIG. 4, to facilitate removal of the crossbar by avoiding interference of the second jaw member 134 with the lip 116. This design is advantageous for facilitating easy operation and disassembly of the article carrier crossbars. Of course, alternative configurations for the lip and jaws are considered to be within the spirit and scope of this invention.

FIGS. 6 and 7 show an underside view of the stanchion in accordance with the present invention. FIG. 7 illustrates the ramped surfaces 54 and the detent 56 formed in the stanchion. FIG. 8 shows a vertical cross-section of the ramped surface 54, detent 56 and stem 46. The stem 46 rides along one of the ramped surfaces 54 until it is engaged within the detent 56. When the stem 46 is engaged within the detent 56, the thumbwheel 48 is locked into position, and the jaws are held together about the lip of the crossbar.

While the best mode for carrying out the invention has been described in detail, those familiar with the art to which this invention relates will recognize various alternative designs and embodiments for practicing the invention as defined by the following claims.

What is claimed is:

1. A vehicle panel mounted article carrier, comprising:

a pair of spaced longitudinal side rails, each of said side rails having a lip protruding therefrom, each lip having first and second surfaces;

a crossbar having first and second ends thereof, each end including a stanchion for supporting said crossbar on said longitudinal side rails, at least one of said stanchions having a ramped surface and an upper surface;

said at least one of said stanchions having a first jaw member with a first jaw surface engageable with said first surface of one of said lips;

a second jaw member pivotally coupled about a pivot axis with respect to said first jaw member for engagement with said lip opposite said first jaw surface, said second jaw member having a second jaw surface engageable with said second surface of said one of said lips;

a clamp for selectively clamping said first and second jaw members with respect to said one of said lips, including a thumbwheel and stem carried by said second jaw member, said stem including a cam follower surface thereon for engagement with said ramped surface on said at least one of said stanchions to selectively secure said second jaw member with respect to said at least one of said stanchions when said thumbwheel is rotated to engage said cam follower surface with said ramped surface; and wherein the axis for pivoting said second jaw member is intermediate said second jaw surface and said stem.

2. The article carrier of claim 1, further comprising a torsional spring operatively connected about said pivot axis between said first and said second jaw members for biasing said second jaw member toward an unclamped position to provide clearance with respect to said lip for disassembly.

3. The article carrier of claim 1, further comprising:

said one of said lips including a plurality of apertures formed in said second surface spaced longitudinally therealong; and a jaw finger protruding from said second jaw surface for selective operative engagement within any one of said plurality of apertures formed in said second surface of said one of said lips to prevent longitudinal movement of said crossbar with respect to said side rail.

4. The article carrier of claim 1, wherein said second surface of said one of said lips includes a plurality of laterally spaced notches formed therein to receive said second jaw surface and prevent longitudinal movement of said crossbar with respect to said side rail.

5. The article carrier of claim 1, further comprising a detent formed closely adjacent said ramped surface on said at least one of said stanchions to engage with said cam follower surface on said stem for locking said first and second jaw members in a clamped position when said cam follower surface is moved past said ramped surface.

6. The article carrier of claim 1, wherein said thumbwheel is in a substantially flush relationship with said upper surface of said at least one of said stanchions.

7. A vehicle panel mounted article carrier, comprising:

a pair of side rails;

a crossbar;

a pair of stanchions connected to opposite ends of said crossbar and supporting said crossbar with respect to said side rails, at least one of said stanchions having a ramped surface;

a first jaw member fixed to at least one of said stanchions for engagement with one of said side rails;

a second jaw member pivotally coupled to said one of said side rails, said second jaw member having first and second ends thereof, and including a jaw surface at the first end thereof, said pivotal coupling being intermediate said first and second ends;

a clamp operatively connected to said second end of said second jaw member for clamping said first and second jaw members to secure said crossbar with respect to said one of said side rails, said clamp including a thumbwheel and stem carried by said second jaw member, said stem including a cam follower surface thereon for engagement with said ramped surface to selectively secure said second jaw member with respect to said at least one stanchion, and said clamp being positioned at said second end of said second jaw member; and wherein said second jaw member is spaced sufficiently away from said one of said side rails when said second jaw member is in an unclamped position so as to provide clearance from said one of said side rails for disassembly.

8. The article carrier of claim 7, further comprising a spring operatively connected between said first and second jaw members to bias said second jaw member toward a fully open unclamped position.

9. A mounting bar for a vehicle panel mounted article carrier having a pair of spaced longitudinal side rails, each side rail having a lip protruding therefrom, each lip having first and second surfaces, comprising:

a crossbar having first and second ends thereof, each end including a stanchion for supporting said crossbar on the longitudinal side rails, at least one of said stanchions having a ramped surface;

said at least one of said stanchions having a first jaw member with a first jaw surface engageable with said first surface of one of said lips;

a second jaw member pivotally coupled with respect to said first jaw member for engagement with said lip opposite said first jaw surface, said second jaw member having a second jaw surface engageable with said second surface of said one of said lips;

a clamp for selectively clamping said first and second jaw members with respect to said one of said lips, including a thumbwheel and stem carried by said second jaw member, said stem including a cam surface thereon for engagement with said ramped surface on said at least one of said stanchions to selectively secure said second jaw member with respect to said at least one of said stanchions when said thumbwheel is rotated to engage said cam surface with said ramped surface; and wherein the axis for pivoting said second jaw member is intermediate said second jaw surface and said stem.

10. The mounting bar of claim 9, further comprising a torsional spring operatively connected about said pivot axis between said first and said second jaw members for biasing said second jaw member toward an unclamped position to provide clearance with respect to said lip for disassembly.

11. The mounting bar of claim 9, further comprising a detent formed closely adjacent said ramped surface on said at least one of said stanchions to engage with said cam surface on said stem for locking said first and second jaw members in a clamped position when said cam surface is rotated beyond said ramped surface.

* * * * *